United States Patent [19]

Seifert

[11] E Re. 30,011

[45] Reissued May 29, 1979

[54] DEFIBERING APPARATUS FOR PAPER MAKING STOCK

[75] Inventor: Peter Seifert, Middletown, Ohio

[73] Assignee: The Black Clawson Company, Middletown, Ohio

[21] Appl. No.: 828,269

[22] Filed: Aug. 29, 1977

Related U.S. Patent Documents

Reissue of:

[64] Patent No.: 3,960,332
Issued: Jun. 1, 1976
Appl. No.: 517,330
Filed: Oct. 23, 1974

[51] Int. Cl.[2] ..... B02C 7/06; B02C 7/12

[52] U.S. Cl. ..... 241/46.06; 241/46.04; 241/259.1; 241/261.1

[58] Field of Search ..... 241/46 R, 46 B, 46.02, 241/46.04, 46.06, 202, 244, 259.1, 261, 261.1, 261.3

[56] References Cited

U.S. PATENT DOCUMENTS

| | | | |
|---|---|---|---|
| 1,705,996 | 3/1929 | Pope | 241/259.1 X |
| 1,863,184 | 6/1932 | Brazeau et al. | 241/259.1 |
| 2,296,280 | 9/1942 | Gruender | 241/202 |
| 2,917,247 | 12/1959 | Gruender | 241/202 |
| 2,921,749 | 1/1960 | Brink, Jr. et al. | 241/261.1 |
| 3,144,994 | 8/1964 | Danforth | 241/261.1 |
| 3,452,939 | 7/1969 | Johnson | 241/261.1 |
| 3,506,202 | 4/1970 | Cumpston, Jr. | 241/46.04 |
| 3,698,649 | 10/1972 | Herbert | 241/46.02 X |

*Primary Examiner*—Howard N. Goldberg
*Attorney, Agent, or Firm*—Biebel, French & Nauman

[57] ABSTRACT

A deflaker for use in defibering coarse paper making stock includes a rotor and stator having frusto-conical working faces, each of which has therein one or more circumferential rows of angularly spaced pockets separated by axially extending land areas and with a circumferential land between adjacent rows of pockets, the proportions and arrangement of the parts being such that the stock is forced to travel back and forth between rotor and stator pockets as it passes through the working zone. The inlet chamber in which the rotor and stator operate is of substantially larger diameter to provide outlying space to which high specific gravity contaminant materials are directed by the centrifugal force generated by the rotor, and this action is enhanced by a cover plate on the inlet end of the rotor which has the dual function of defining with the adjacent end wall of the stator an entry slot to the working zone, and of developing additional centrifugal force further tending to prevent high specific gravity contaminant materials from reaching this inlet slot. The working faces of the rotor and stator are axially symmetrical so that the rotor can be driven in either direction to double the working life of these elements, and when it is necessary to remove and replace any of the working elements, this can be done without disturbing any piping connections by simply removing a cover plate which forms one wall of the inlet chamber.

35 Claims, 20 Drawing Figures

DEFIBERING APPARATUS FOR PAPER MAKING STOCK

Matter enclosed in heavy brackets [ ] appears in the original patent but forms no part of this reissue specification; matter printed in italics indicates the additions made by reissue.

BACKGROUND OF THE INVENTION

This invention relates to apparatus of the type commonly known as "deflakers" which are used in the preparation of paper making stock, especially from waste paper materials of widely varying characteristics.

Deflakers are often used to perform a defibering operation on relatively coarse stock which has either been extracted from a pulper without screening, or which has been rejected by a relatively coarse screen after extraction from a pulper. Such stock can therefore be expected to contain not only a high proportion of usable but still undefibered paper material, but also substantial quantities of reject materials such as plastic, tramp metal such particularly as staples, screws, wire, nuts and bolts, and other hard contaminant materials.

A significant problem which has been encountered by deflakers of the prior art has been their inability to handle successfully stock which contains tramp metal. More specifically, the prior art deflakers have shown a tendency to be self-destructive in that they will accept stock containing tramp metal, but their filling or tackle becomes so damaged in attempting to disintegrate the metal that it becomes useless for further defibering action.

Other practical disadvantages of prior art deflakers have included the cost of their filling or tackle, its tendency to wear to the point of unacceptably low effectiveness, and the time and effort required for its replacement, which commonly includes the necessity of disconnecting and reconnecting one or both of the inlet and outlet pipe lines. Further, prior art deflakers often permit stock to flow through grooves in the working face of the rotor or stator without entering the high shear defibering zone between those faces, which results in poorly defibered stock.

SUMMARY OF THE INVENTION

The primary object of this invention is to provide a deflaker which will have high defibering efficiency, in which there will be minimal possibility for stock to bypass the working zone, and especially which will prevent tramp metal from entering the working zone and thereby protect itself against self-destruction.

An additional object of the invention is to provide such a deflaker wherein the working elements are relatively low in cost, from the standpoint of both manufacturing costs and service life, which can be removed and replaced quickly and easily without the necessity of disconnecting any pipes, and wherein the rotor can be operated selectively in either direction with equal effectiveness and will therefore provide two sets of working edges which can be used in turn after the first set has become worn, or on a more frequent basis to prolong the wear life of the working edges.

These objectives are achieved in accordance with the invention by deflaking apparatus wherein the housing encloses an inlet chamber of relatively large dimensions in comparison with the working elements which operate therein and comprise a rotor and a stator having complementary frusto-conical working faces. Each of these faces is provided with one or more circumferential rows of pockets spaced from each other to provide an extending land area between adjacent pockets, and the edges of each of these land areas on the rotor extend generally lengthwise of the rotor.

The apparatus is preferably provided with a reversible drive so that each set of land edges can operate selectively as leading edges. When the rotor is running in one direction, these leading edges tend to be progressively rounded, but at the same time, the trailing edges tend to become sharpened. In fact, if relatively soft metals are used in the rotor, a burr will form on the trailing edges which is relatively fragile but sharp. Preferred results are obtained by relatively frequent changing of the direction of rotation of the rotor, thereby utilizing the beneficial effects of trailing edge sharpening or reconditioning and correspondingly significantly prolonging wear life and constant operating efficiency.

Many variations of the patterns of the working faces are possible, and in a preferred embodiment, each of the pockets in the rotor and stator has generally axially extending side walls and one generally radially extending end wall, which is the back wall in the rotor and the front wall in the stator. The peripheries of these end walls and the intervening areas of the working face combine to form circumferential lands on both the rotor and stator. The axial dimensions of the rotor and stator themselves and of the pockets in their working faces are of predetermined relationship such that each of these circumferential lands is in opposed relation with a row of pockets in the other working element, thereby forcing the stock to travel back and forth between pockets in the rotor and stator as it passes through the working zone from the inlet port to the outlet port of the housing.

The use of frusto-conical working faces contributes an additional operational feature of the apparatus in that relative axial adjustment of the rotor and stator provides for corresponding adjustment of the working clearance between their working faces. This enables the operator to compensate from time to time for wear of the working elements so that the apparatus can produce uniformly treated pulp over long periods of time in spite of wear. Also, this enables the operator to compensate when more or less easily defiberable material is fed to the apparatus.

Special provision is made in accordance with the invention for minimizing the possibility for access by tramp metal and other high specific gravity materials to the working zone. This result is accomplished in part by the relatively large diametral dimensions of the inlet chamber as compared with the smaller ends of the rotor and stator which extend into this chamber. The centrifugal forces generated by rotation of the rotor have a natural tendency to cause high specific gravity materials to migrate to the outer wall of the inlet chamber for easy removal rather than to remain in the flow of stock which enters the working zone.

Positive protection against tramp metal and the like is provided by a front end cap on the rotor which includes a peripheral skirt portion of greater diameter than the inner diameter of the smaller end of the stator and thereby forms with the front end of the stator a circumferential slot of relatively small axial dimension through which all stock must pass in order to enter the working zone. This cap enhances the centrifugal action which causes high specific materials to move outwardly away from this inlet slot, and the dimensions of the slot itself further discourage the entry of overlarge pieces. The inlet chamber is provided with one or more clean-out ports from which such reject materials can be easily removed from time to time.

An additional feature of the invention, which is contributed to by the relative dimensions of the inlet chamber and of the rotor and stator, is the case of replacement of these working elements. The end of the housing which encloses the inlet chamber is provided with a cover plate enclosing an opening larger in diameter than the rotor and stator, so that when this cover plate is removed, the rotor and stator can be dismounted, taken out through the resulting opening, and replaced with minimum down time and without requiring disconnection of any piping leading to or from the apparatus.

DESCRIPTION OF THE PREFERRED EMBODIMENTS

Figure 1:
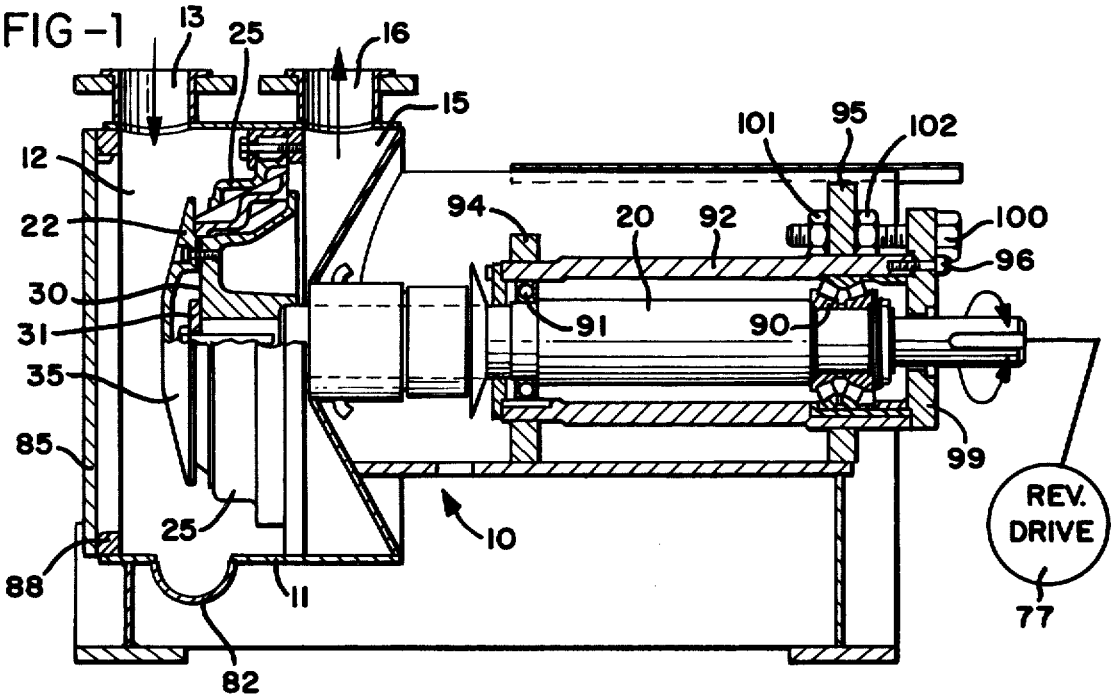
FIG. 1 is a vertical axial section through deflaking apparatus in accordance with the invention.

The main body 10 of the deflaking apparatus includes at one end an essentially cylindrical housing portion 11 enclosing the inlet chamber 12 to which the stock is delivered through the inlet port 13 at the top of the housing 11. The annular outlet chamber 15 at the back of the housing 11 is similarly provided with an outlet port 16 at the top, and at the bottom of the chamber 12 is a pair of clean-out ports 17. The remainder of the main body 10 beyond the housing portion 11 comprises the supporting and adjusting structure for the rotor drive shaft 20, as described in detail hereinafter.

Figure 5:
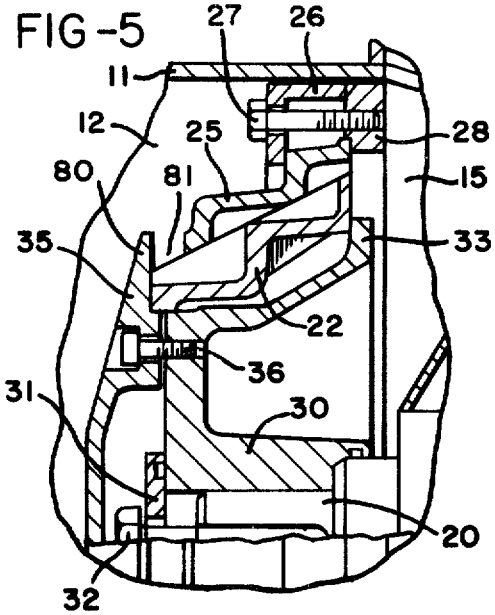
FIG. 5 is an enlarged fragment of FIG. 1.

The inlet and outlet chambers 12 and 15 within housing 11 are separated by the working elements of the apparatus, which are the frusto-conical rotor 22 on shaft 20 and the complementary stator 25. The stator 25 is secured within the housing 11 by three angularly spaced clamps 26 of L-shaped section and screws 27 threaded into a mounting ring 28 welded within the housing 11, one of these clamps 26 being shown in FIG. 5 and the others being equidistant therefrom and from each other. The rotor 22 is mounted on the front end of the shaft 20 by a hub 30 keyed on the end of the shaft and held in place by a retainer plate 31 and screw 32. The hub 30 includes a flange 33 at its inner (larger) end, and the rotor 22 is clamped against this flange by means of the end cap 35 which is mounted on the hub 30 by a series of screws 36.

Figure 6:
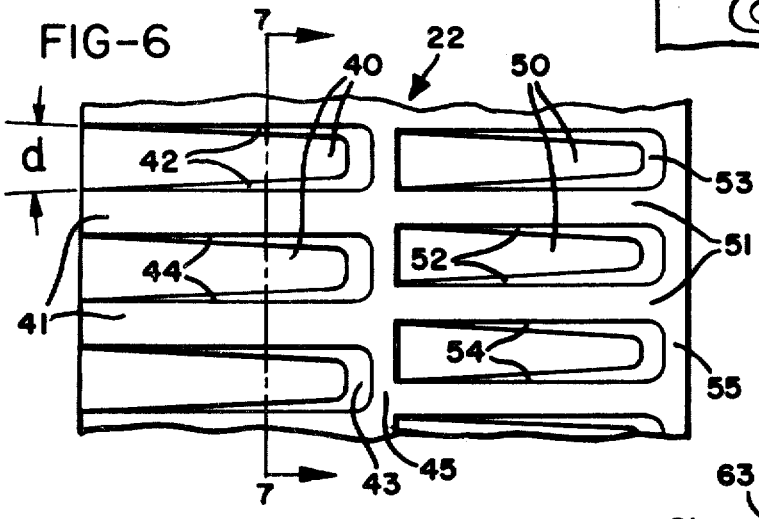
FIG. 6 is a fragmentary view of the working face of the rotor of FIGS. 1 and 5.
Figure 7:
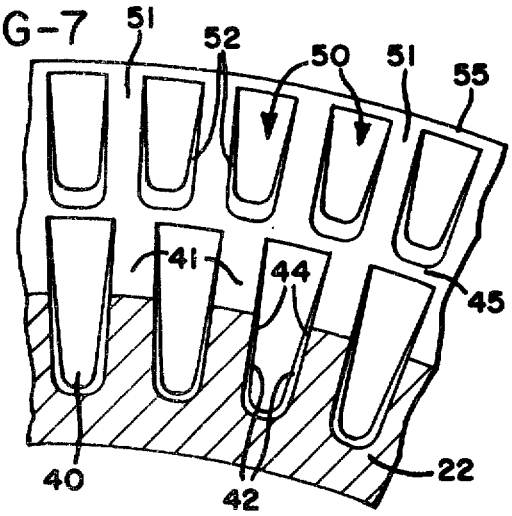
FIG. 7 is a section on the line 7—7 of FIG. 6.

Referring to FIGS. 6 and 7, the frusto-conical working face of the rotor 22 is provided with two circumferential rows of angularly spaced pockets separated by axially and circumferentially extending land areas. The pockets 40 in the front row are separated by land areas 41 in equally spaced relation around the small end of the rotor. Each of these pockets 40 has side walls 42 which extend generally axially of the rotor, and a back wall 43 extending generally radially of the rotor. This arrangement provides edges 44 along opposite sides of each of the land areas 41, *but the bottom wall 56 of each pocket extends from the associated back wall 43 to the surface of the rotor so that the back wall 43 constitutes the only end wall of the pocket.*

The outer peripheries of the back walls 43 meet the working face of the rotor and form therewith a circumferential land 45 which separates the row of pockets 40 from the row of pockets 50. These pockets 50 are similar to the pockets 40 in shape but smaller in all their dimensions, and they are similarly separated by axial land areas 51. The side walls 52 of the pockets 50 also extend generally axially, and each pocket has a generally radially extending back wall 53. The working edges 54 of the land areas 51 correspond to the similar working edges of the land areas 41, and the peripheries of the back walls 53 meet the working face of the rotor and form therewith a second circumferential land 55 around the large end of the rotor.

Figure 11:
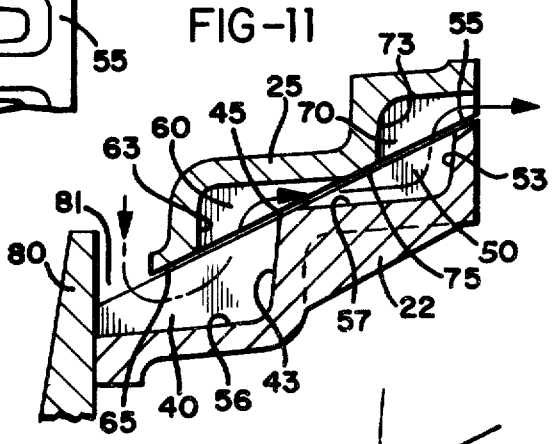
FIG. 11 is a fragmentary and somewhat diagrammatic axial section similar to FIG. 5 and illustrating the operation and working relation of the rotor and stator.
Figure 8:
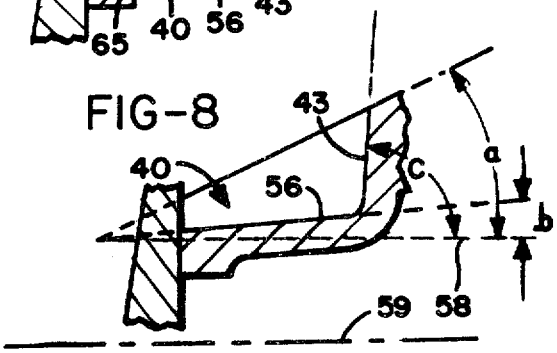
FIG. 8 is a diagram identifying reference angles for describing the geometry of the pockets in the rotor.

As best shown in FIGS. 8 and 11, the bottom walls 56 and 57 of the pockets 40 and 50 extend generally parallel with the axis of the rotor, or at a relatively small angle with respect thereto, and this results in making each pocket of increasing depth from front to back, with the maximum depth being along its back or end wall. Further, the pockets 40 and land areas 41 are fewer in number and individually wider than the pockets 50 and land areas 51, which provides a correspondingly greater number of working edges 54 around the larger end of the rotor. As an example of satisfactory dimensions, a rotor having a maximum diameter of 19 inches at the outer edge of the land 55 may have 54 land areas 41 each approximately 0.40 inch in width, and 72 land areas 51 each approximately 0.30 inch in width.

The geometric configuration of each pocket 40 and 50 can be described generally in terms of several angles with reference to FIG. 8, wherein a represents ½ of the included angle of the frusto-conical working face of the rotor, b is the angle defined by the bottom wall 56 of a pocket 40 and a line 58 parallel with the axis 59 of the rotor, and hence also with the axis 59, and the axis of the rotor, and c is the angle defined by the pocket back wall 43 and the rotor axis. Also, referring to FIG. 6, d is the included angle of the pocket side walls 42. For good design in accordance with the invention the relations of these angles should be:

| Angle | Range | Preferred |
|---|---|---|
| a | 15° to 75° | 20° to 30° |
| b | Smaller than c and greater than 0° | 3° to 6° |
| c | Greater than a but not more than 120° | At least 30° greater than a to 90° |
| d | 0° to approximately 60° | 3° to 15° |

The conditions to be considered in selecting a cone angle for the rotor working face include the fact that outside of the indicated range, pocket depth is so small that the cross section through which the slurry flows becomes impractically small. The preferred included angle of 40° to 60° gives sufficient pocket cross section and does not result in excessive diameter increase from the feed end of the rotor to its discharge end, which is desirable because excessive diameter increase produces greater pressure buildup and results in excessive axial thrust values. Note also that as shown, it is convenient to connect the bottom and back walls of each pocket by a smoothly curved portion so that the angular conditions listed above are fulfilled near the surface of the rotor.

Figure 9:
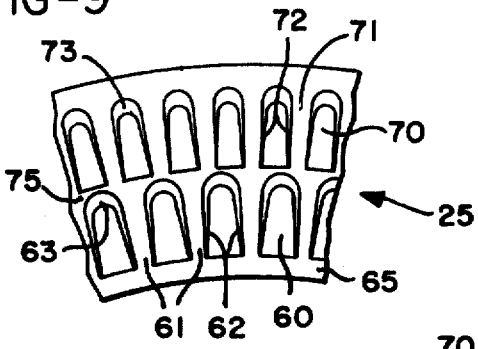
FIG. 9 is a fragmentary view looking axially toward the working face of the stator from right to left in FIG. 5.
Figure 10:
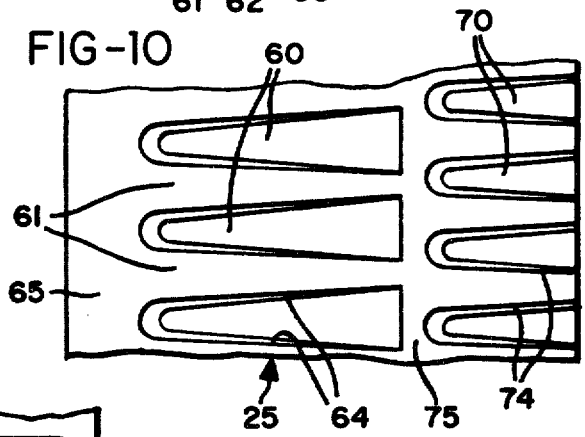
FIG. 10 is a fragmentary view of the working face of the stator taken at right angles to FIG. 9.

The stator 25 has a frusto-conical working face which is in all material respects complementary to that of the rotor 22. Referring to FIGS. 9–10 it includes a front row of pockets 60 separated by land areas 61 and each pocket having side walls 62, which extend generally axially of the stator, and a front wall 63 which extends generally radially of the rotor. The land areas 61 have working edges 64, and there is a circumferential land 65 at the small end of the stator, *but the bottom wall of each stator pocket extends from its associated front wall 63 to the surface of the stator so that the front wall 63 constitutes the only end wall of the pocket.*

The pockets 70 in the second row are smaller in all dimensions than the pockets 60 and are similarly separated by land areas 71. The side walls 72 of each pocket 70 extend generally axially toward the large end of the stator from the generally radially extending front wall 73. The land areas 71 have working edges 74 like those on the other land areas, and there is a circumferential land 75 which separates the two rows of pockets and is composed of the exposed peripheries of the pocket walls 73 and the intervening portions of the working face of the stator. The configuration of each of the pockets 60 and 70 should conform to geometric limitations corresponding to those discussed for the rotor pockets 40 and 50.

FIG. 11 illustrates somewhat diagrammatically the working relation of the working faces of the rotor 22 and stator 25. The parts are so proportioned that when these working faces are in proper working relationship, with a close clearance therebetween, the small end of the rotor projects outwardly from the stator, the several circumferential lands are in axially staggered relation with each other, and each of these lands is in radially opposed relation with a row of pockets in the complementary working element. As a result, the stock must enter the working zone through the shallow ends of the rotor pockets 40, and since it cannot advance axially in any pocket 40 beyond its rear wall 43, it must transfer into the stator pockets 60, but it cannot travel in them beyond the circumferential land 75 and must therefore enter a rotor pocket 50. Once again, axial flow in the pockets will be interrupted by the pocket back walls 53, causing a further transfer of the stock to the stator pockets 70 before it reaches the outlet chamber 15.

The passage of stock through the working zone as summarized in the preceding paragraph is illustrated by the series of arrows in FIG. 11. It will be understood, however, that it will not be possible for the stock to follow this path in a continuous axial direction. Instead, the solid material in the stock will be subjected to repeated working between the surfaces of opposed land areas, and especially to the working action of the rotor pocket edges 44 and 54 as they travel past successive stator pockets, the land areas therebetween, and especially the land edges 64 and 74 on the stator. The stock is therefore effectively prevented from bypassing the working zone by following only open channels through successive pockets, and this result is also contributed to by the variation in the size and number of the pockets in the successive rows in both the rotor and stator.

As previously noted, the land edges 44, 54, 64 and 74 are particularly active in the defibering operations of the apparatus, and it necessarily follows that in due course, they may become worn or blunted. With the rotor and stator pockets so formed that these land edges extend generally axially, or at equal but opposite angles to the axis, however, it is then necessary only to reverse the direction of the rotor when this has occurred, or preferably to reverse the drive at frequent intervals and thereby to obtain the self-sharpening action previously described. This is easily done by providing the rotor shaft 20 with any suitable conventional reversible drive, or a reversing switch for a standard motor, as indicated diagrammatically at 77, thus more than doubling the service life of a single set of working elements. In addition to this service life advantage, the rotor and stator of the invention offer the further practical advantage that they can be cast without expensive coring or readily fabricated from blanks of stainless steel or other desired metal which can be appropriately hardened.

The action of the invention in minimizing the possibility that tramp metal and other high specific gravity metals can reach the working zone is contributed to by a number of factors or features. In the first place, with the front end of the rotor substantially smaller than the inner diameter of the inlet chamber 12, e.g. a minimum diameter of 13 inches across the bottoms of the pockets 40 as compared with an inner diameter of 24 inches for the chamber 12, the rotation of the rotor alone will develop centrifugal force which will have a strong tendency to cause the high specific gravity materials to migrate toward the wall of the housing 11 rather than to remain sufficiently near the center of the chamber to be in position to enter a rotor pocket.

More positive assurance against the access of heavy materials to the rotor pockets 40 is provided by the rotor cap 35, which is a frusto-conical member of sufficiently greater base diameter than the small end of the rotor to form an annular skirt 80 radially overlying the inlet ends of the rotor pockets 40. As shown, this skirt 80 is of sufficiently greater diameter than the inner diameter of the small end of the stator, e.g. 1 inch or more, that it forms with the outer end wall of the stator a circumferential slot 81 through which stock must pass in order to enter a rotor pocket 40, preferred results having been obtained with this slot having an axial dimension of approximately three-fourths inch. In addition, the rotation of the rotor cap 35 develops centrifugal force which will be most effective against any heavy materials near its outer periphery, and which will thus augment the action of the rotor in causing such heavy materials to travel to the outer wall of the housing 11, and ultimately to the trough 82 extending between the cleanout ports 17.

Figure 2:
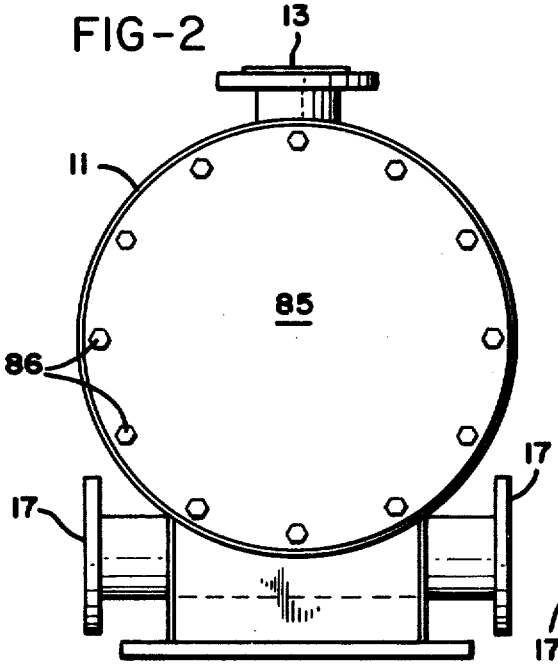
FIG. 2 is an end view looking from left to right in FIG. 1.

The relative dimensions of the rotor 22 and the housing 11 noted above also contribute significantly to another feature of the invention, namely the ease of replacement of the working elements. As shown in FIGS. 1 and 2, the front wall of the housing 11 is formed by a circular cover plate 85 removably secured by screws 86 to a ring 88 welded inside the housing 11. Removal of this cover plate exposes the entire interior of chamber 12 through the resulting opening, which is larger in diameter than both the rotor and stator. The removal of the latter for replacement through this opening therefore requires only the release of the screws 36 mounting the rotor cap 35 on hub 30 and of screws 27 holding the stator clamps 26 in place, since the hub 30 remains on the shaft. It is especially advantageous that this servicing operation does not require any interference with the pipe or hose connected to either of the ports 13 and 16, except other than to close whatever valve may control each such pipe or hose.

Figure 3:
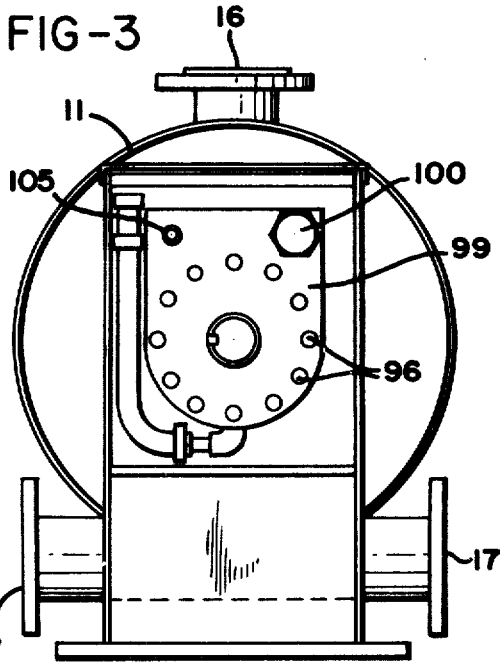
FIG. 3 is an end view looking from right to left in FIG. 1.
Figure 4:
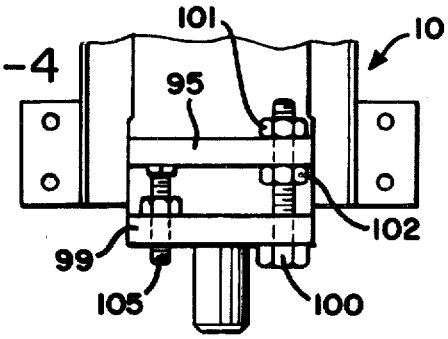
FIG. 4 is a fragmentary plan view of the drive end of the apparatus shown in FIG. 3.

The invention also provides for relative adjustment of the rotor 22 and stator 25 to the desired working clearance of their working faces, the preferred range of which has been found to be 0.01 to 0.15 inches, with 0.03 inches providing optimum stable operation. Referring to FIGS. 1 and 3–4, the shaft 20 is supported by a thrust bearing 90 and radial bearing 91 in a tubular housing 92 which is in turn supported for controlled axial adjustment in a pair of inner and outer wall members 94 and 95 welded within the portion of main body 10 beyond the housing 11. An adjusting plate 99 is mounted on the outer end of the bearing housing 92 by a plurality of screws 96 and is provided with means for effecting its controlled adjustment with respect to the wall 95.

More specifically, an adjusting screw 100 is threaded through the adjusting plate 99 and passes freely through a bore in the wall 95. Nuts 101 and 102 are threaded on the screw 100 on either side of the wall 95, and it will be seen that by releasing either of these nuts and tightening the other, the screw 100 can be pushed or pulled through the wall 95 and thereby cause corresponding movement of the adjusting plate 99, the bearing housing 92 and the shaft 20. An indexing screw 105 is fixed with its head on the inner side of the adjusting plate 99 to form a stop limiting inward movement of plate 99 with respect to wall 95 beyond the position in which the working faces of the rotor and stator are just out of frictional contact.

Figure 12:
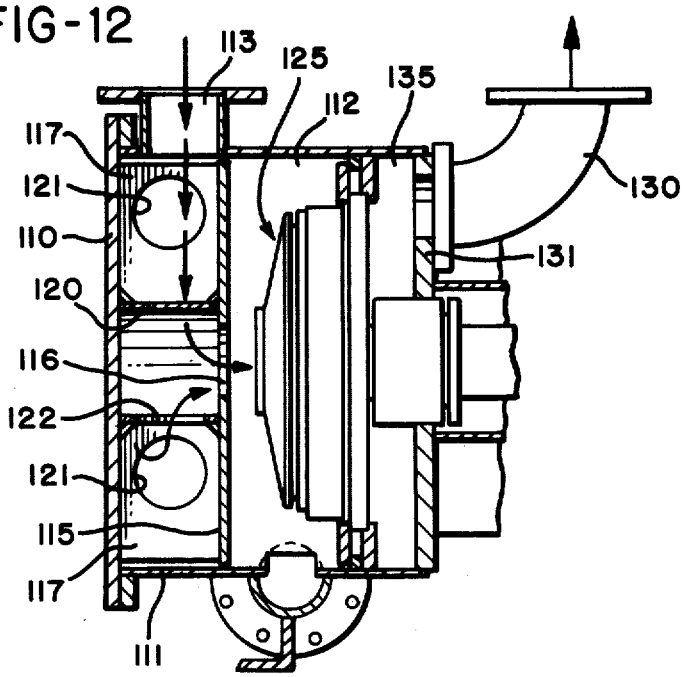
FIG. 12 is a fragmentary view similar to FIG. 1 and taken on the line 12—12 in FIG. 13 to show a modified construction.
Figure 13:
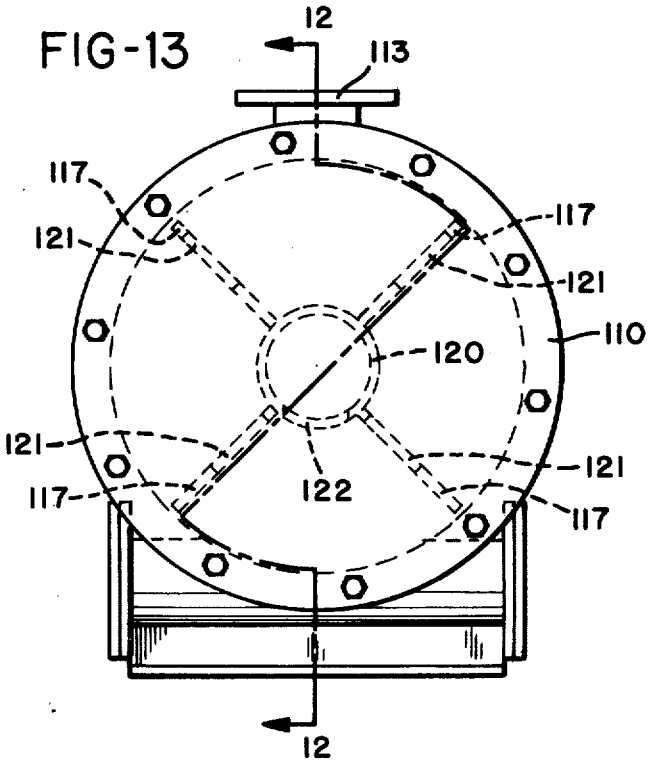
FIG. 13 is an end view looking from left to right in FIG. 12.

FIGS. 12 and 13 show a modified construction wherein the cover plate 110 for the housing portion 111 incorporates baffle means for guiding the stock to the center of the inlet chamber 112 from the inlet port 113. An annular partition plate 115 having a central opening 116 is mounted on the inside of the cover plate 110 by a plurality of radially extending webs 117 and a central tubular member 120. The webs 117 each have a large center hole 121 therein, and there is a similar hole 122 in the lower side of the tubular member 120.

With this construction, stock entering through the inlet port 113 can reach the interior of the inlet chamber 112 only by passing through at least two of the holes 121, the hole 122 and the opening 116. It is therefore virtually impossible for heavy specific gravity material to reach the inlet chamber, and if any such material, e.g. tramp metal, should be trapped on the upper side of the tubular member 120, it is easily removed by taking off this cover plate assembly from time to time and dumping such accumulated reject. This cover plate construction also offers the further practical advantage of reducing the inlet pressure requirements, which would otherwise be determined by the radial pressure buildup resulting from rotation of the stock in the inlet chamber, but this rotational effect cannot influence the entering flow until the stock has passed through the opening 116.

The working members of the apparatus shown in FIG. 12 are identified generally at 125 and are of the same construction described in connection with FIGS. 1–11. However, FIG. 12 does show a modified arrangement of discharge port comprising an elbow 130 mounted on the back wall 131 of that portion of the housing enclosing the outlet chamber 135. This part of the housing, however, could be constructed in the same manner shown in FIG. 1.

Figure 14:
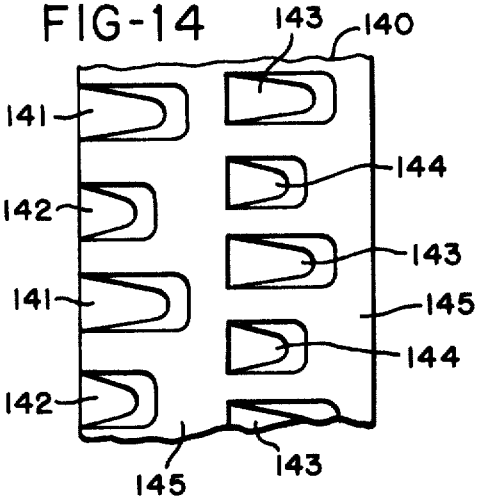
FIG. 14 is a view similar to FIG. 6 and showing a modified arrangement of pockets in the working face of a rotor in accordance with the invention.

FIGS. 14–20 illustrate a variety of modifications of the apparatus of FIGS. 1–13 which also embody the principles of the invention. Thus FIG. 14 shows a fragment of a rotor 140 having two peripheral rows of pockets in its working face but with each row consisting of alternating relatively long and relatively short pockets. More specifically, the row of pockets adjacent the smaller end of the rotor comprise relatively long pockets 141 alternating with relatively short pockets 142, and the other row similarly comprises relatively long pockets 143 alternating with relatively short pockets 144. The rotor 140 also has circumferential lands 145 adjacent its larger end and between the two rows of pockets of its working face, and each pocket should conform generally to the same geometry disclosed by the above in connection with FIG. 8. The stator with which the rotor 140 is used will preferably have a complementary pattern of rows of alternately long and short pockets in the working face thereof.

Figure 15:
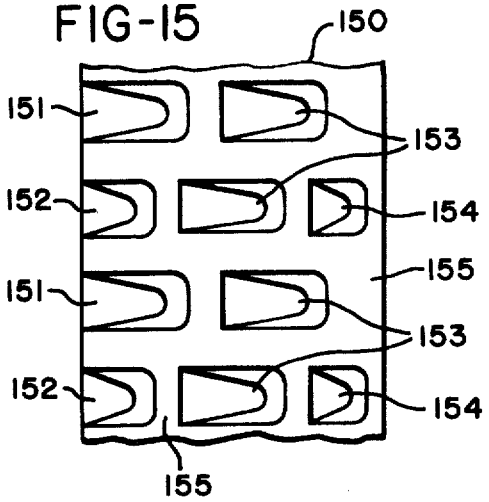
FIG. 15 is a view similar to FIG. 14 and showing another modified arrangement of rotor pockets.

FIG. 15 shows a modified rotor 150 generally similar to the rotor 140 in that the row of pockets adjacent the smaller end thereof comprises alternating long pockets 151 and short pockets 152. The rotor 150 also includes a second circumferential row of pockets 153 shown as of essentially the same dimensions as a long pocket 151 and in axially uniformly spaced relation therewith. Since this arrangement would leave a relatively wide land area between alternate pockets 153 and the larger end of the rotor, an additional relatively short pocket 154 is provided in each such space. The rotor 150, however, still includes circumferential lands 155 at the larger end thereof and between the two rows of pockets thereon. The stator with which this rotor 150 is used will preferably have a complementary pattern of pockets in its working face.

Figure 16:
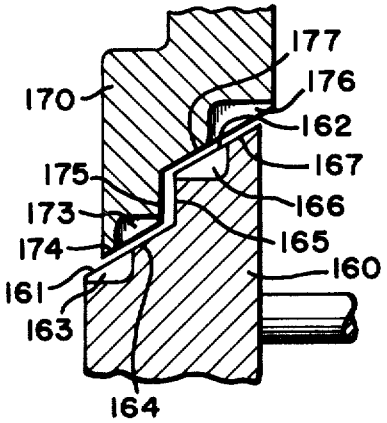
FIG. 16 is a fragmentary and somewhat diagrammatic view showing working elements in accordance with the invention wherein both the rotor and stator include a pair of working faces of substantially different radial dimensions.

FIG. 16 shows a modified construction of working elements in accordance with the invention wherein the rotor 160 has a frusto-conical working face 161 of relatively small average radius adjacent the inlet end thereof and a working face 162 of substantially larger average radius adjacent its discharge end. The working face 161 has pockets 163 therein similar to the pockets 40 as already described. There is also an annular land 165 extending radially from the larger end of the working face 161 to the smaller end of the working face 162. The pockets 166 in the working face 162 are also similar in geometry and distribution to the pockets 163, and there is therefore a circumferential land 167 around the larger end of the working face 162.

The stator 170 in FIG. 16 is shown as essentially complementary to the rotor 160, in that it has a small radius working face comprising similar pockets 173, and land 174, a radial land 175, and a large radius working face comprising pockets 176 and a land 177 all arranged in complementary fashion to the corresponding portions of the rotor 160. It should also be understood that either or both of the working faces of the rotor and stator can have a plurality of rows of pockets therein similarly to the rotor 22 and the stator 25, and also that the dimensions and arrangement of all of these pockets are subject to variation such as described in connection with FIGS. 14–15. Similarly the rotor 160 will preferably be provided with an end cap similar to and for the same purpose as the end cap 35.

Figure 17:
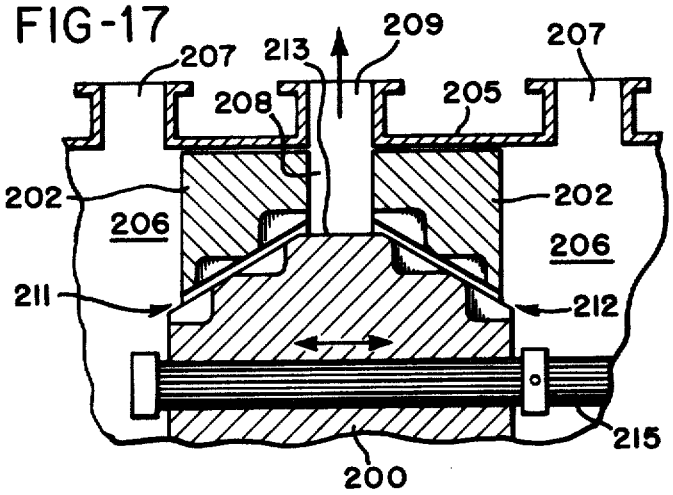
FIG. 17 is a fragmentary and somewhat diagrammatic view showing another modification of the invention wherein the rotor has working faces at both ends thereof each cooperating with a pair of stators.

In the modification shown in FIG. 17, the rotor 200 is double ended and cooperates with a pair of stators 202 in a housing 205 having an inlet chamber 206 at each end thereof provided with its own inlet port 207, and a centrally located annular discharge chamber 208 provided with a discharge port 209. The rotor 200 includes a frusto-conical working face 211 at one end thereof, a similar frusto-conical working face 212 at the other end, and a cylindrical central surface 213. Each of the working faces 211 and 212 is shown as of a construction generally similar to the rotor 22 as already described.

The two stators 202 in FIG. 17 are shown as of identical construction comparable to stator 25 as already described, and each cooperates with its complementary rotor face 211 or 212 in similar manner. This double ended rotor cooperating with two stators offers not only double the working capacity for a small increase in housing size, but also the advantage that with the rotor splined or otherwise mounted for free axial movement on its drive shaft 215, as shown, it can float between the two stators as required to balance the hydraulic pressure conditions between each pair of complementary working surfaces, and thereby to eliminate axial thrust on the shaft 215 and its supporting bearings (not shown). It will also be apparent that the rotor 200 can be provided at each end thereof with an end cap like and for the same purpose as the end cap 35.

Figure 18:
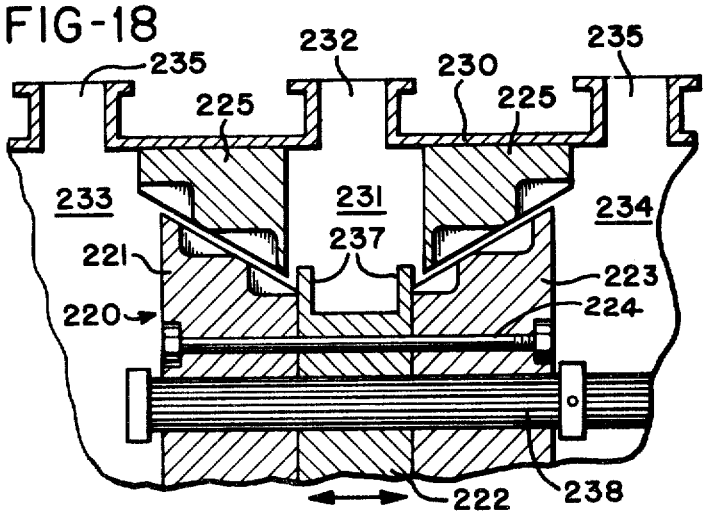
FIG. 18 is a view similar to FIG. 17 and showing the reverse arrangements of FIG. 17 wherein the larger ends of the working faces of the rotor are at the opposite ends of the rotor body.

FIG. 18 shows a double ended rotor 220 of the reverse configuration from rotor 200 in that it has a cylindrical portion 222 of minimum diameter at its middle portion and frusto-conical working portions 221 and 223 at opposite ends thereof, each of these working portions having its section of maximum diameter at the outer end of the rotor body, and the three sections being secured together as by bolts 224. The two stators 225 in FIG. 18 correspond to stators 202 in FIG. 17 but are arranged in the opposite manner for proper cooperation with the complementary working surfaces of the rotor 220.

The housing 230 in FIG. 18 includes an inlet chamber 231 located generally centrally and having an inlet port 232, and there are discharge chambers 233 and 234 adjacent opposite ends of the rotor 220 and each having a discharge port 235. The rotor 220 includes a pair of circumferential flanges 237 which correspond in function to the end cap 35 to block tramp metal and the like from access to the resulting entry slots to the spaces between the working surfaces of the rotor and stators, and it is for this reason that the rotor is made in three portions for installation with the stators 225. It will also be apparent that the rotor 220 can float on its supporting shaft 238 in the same manner, and with the same advantages, as described for the rotor 200 in FIG. 17.

Figure 19:
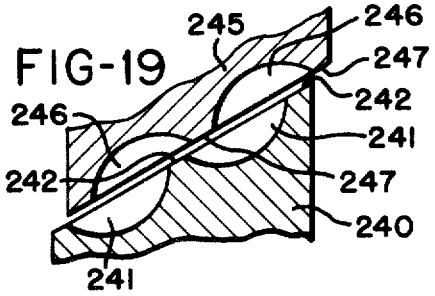
FIG. 19 is a fragmentary sectional view showing a form of rotor and stator in accordance with the invention wherein the pockets in the working faces are milled to an arcuate contour in axial section.

FIG. 19 shows a fragment of a rotor 240 wherein the two rows of pockets 241 are milled to an essentially arcuate contour in axial section, rather than the relatively flat bottoms of the pockets shown in the other views, and cooperate with lands 242. The stator 245 has two rows of similar milled pockets 246 and lands 247. Except for their contour in axial section, the pockets 241 and 246 should substantially conform to the geometry described above in connection with FIG. 8, and this configuration of pocket can be used in any of the other embodiments of the invention disclosed herein.

Figure 20:
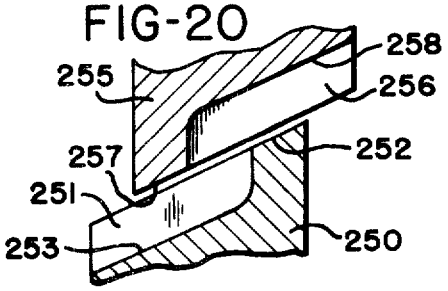
FIG. 20 is a similar view showing another pocket contour.

FIG. 20 shows a fragment of a rotor 250 having a working face composed of multiple pockets 251 and a circumferential frusto-conical land 252. As shown, the bottom 253 of each pocket 251 is essentially parallel in axial section with the face of the rotor, so that the angle defined by the pocket bottom and the axis of the rotor is the same as angle a in FIG. 8. The stator 255 is of complementary construction, with its working face comprising pockets 256 and a land 257, and with the pocket bottom 258 essentially parallel with the rotor pocket bottom 253. These pockets accordingly conform with the overall geometry ranges noted above in connection with FIGS. 6 and 8, and this pocket configuration could be used in any of the other forms of the invention already described.

While the forms of apparatus herein described constitute preferred embodiments of the invention, it is to be understood that the invention is not limited to their precise forms of apparatus, and that changes may be made therein without departing from the scope of the invention. It is also to be understood that use of the apparatus of the invention is not limited to the treatment of paper making stock, and that the apparatus may be used for the defibering or deflaking of other liquid slurry stocks, for example in the processing of tobacco.

What is claimed is:

1. Apparatus for defibering liquid slurry stocks, comprising:

a. a housing defining a chamber having an inlet port and an outlet port adjacent opposite ends thereof, b. an annular stator mounted within said chamber between said ports and having a frusto-conical internal working face with the smaller end thereof adjacent said inlet port, c. a rotor mounted in said housing for rotation within said stator and having a frusto-conical working face complementary to and aligned within said stator face, d. each of said working faces having therein at least one circumferential row of angularly spaced pockets separated by axially extending land areas, e. each of said pockets in said rotor having generally axially extending side walls and a generally radially extending back wall cooperating with portions of said land areas on said rotor face to form a circumferential land,

*f. each of said rotor pockets having a bottom wall extending from said back wall thereof to the surface of said rotor whereby said back wall constitutes the only end wall of said pocket,*

[f.] *g.* each of said pockets in said stator having generally axially extending side walls and a generally radially extending front wall cooperating with portions of said land areas on said stator face to form a circumferential land, [and]

*h. each of said stator pockets having a bottom wall extending from said front wall thereof to the surface of said stator whereby said front wall constitutes the only end wall of said pocket, and*

[g.] *i.* the axial dimensions of said pockets and of said rotor and stator being of predetermined relationship locating said circumferential lands thereon in axially staggered relation with each other and in radially opposed relation with said stator and rotor pockets respectively to force the stock to travel back and forth between said pockets in flowing from said inlet port to said outlet port.

2. Defibering apparatus as defined in claim 1 further comprising means on said smaller end of said rotor forming an annular skirt of greater outer diameter than the inner diameter of the adjacent end of said stator face and cooperating therewith to define a radially outwardly opening circumferential entry slot to the front ends of said rotor pockets and thereby to minimize the access of high specific gravity materials to said pockets.

3. Defibering apparatus as defined in claim 2 wherein said chamber is of greater inner dimensions than the outer dimension of said stator in a plane perpendicular to the axis of said rotor to provide an annular space therein surrounding the adjacent ends of said rotor and stator for collection of high specific gravity contaminant materials, and means forming a cleanout port from said space.

4. Defibering apparatus as defined in claim 1 wherein each of said working faces on said rotor and stator include two circumferential rows of said angularly spaced pockets and land areas separated by a second circumferential land, and wherein the axial dimensions of said pockets and of said rotor and stator are of predetermined relationship locating all of said circumferential lands thereon in axially staggered relation with each other and in radially opposed relation with said stator and rotor pockets respectively to force the stock to travel back and forth between said rotor and stator pockets in flowing from said inlet port to said outlet port.

5. Defibering apparatus as defined in claim 4 further comprising means on said smaller end of said rotor forming an annular skirt of greater outer diameter than the inner diameter of the adjacent smaller end of said stator face and cooperating therewith to define a radially outwardly opening circumferential entry slot to the front ends of said rotor pockets and thereby to minimize the access of high specific gravity materials to said pockets.

6. Defibering apparatus as defined in claim 5 wherein said pockets in the row adjacent the smaller end of each of said rotor and stator are larger in circumferential and/or axial extent than said pockets in the row adjacent the larger end thereof, and wherein said row of pockets adjacent the larger end of each of said rotor and stator contains a greater number of said pockets than said row adjacent the smaller end thereof.

7. Defibering apparatus as defined in claim 4 wherein said row of pockets adjacent the larger end of each of said rotor and stator contains a greater number of said pockets than said row adjacent the smaller end thereof.

8. Defibering apparatus as defined in claim 4 wherein *at least one of the circumferential and axial dimensions of* said pockets in the row adjacent the smaller end of each of said rotor and stator [are larger in circumferential and/or axial extent than] *is larger than the corresponding dimension of* said pockets in the row adjacent the larger end thereof.

9. Defibering apparatus as defined in claim 8 wherein said row of pockets adjacent the larger end of each of said rotor and stator contains a greater number of said pockets than said row adjacent the smaller end thereof.

10. Defibering apparatus as defined in claim 4 wherein one-half the total included angle of each of said working faces is an angle (a) in the range of 15° to 75°, the angle (d) included by said side walls of each of said pockets is in the range of 0° to 60°, and the angle (c) defined by each of said back and front walls of said pockets and the axis of said rotor is greater than said angle (a) but is not greater than 120°.

11. Defibering apparatus as defined in claim 4 wherein one-half the total included angle of each of said working faces is an angle (a) in the range of 20° to 30°, the angle (d) included by said side walls of each of said pockets is in the range of 3° to 15°, and the angle (c) defined by each of said back and front walls of said pockets and the axis of said rotor is greater than said angle (a) but is not greater than 90°.

12. Defibering apparatus as defined in claim 4 wherein each of said pockets has a bottom wall extending generally parallel with the axis of said rotor to provide each of said pockets with a substantially greater radial depth adjacent said radially extending wall thereof than at the opposite end thereof, and wherein one-half the total included angle of each of said working faces is an angle (a) in the range of 15° to 75°, the angle (d) included by said side walls of each of said pockets is in the range of 0° to 60°, the angle (c) defined by each of said back and front walls of said pockets and the axis of said rotor is greater than said angle (a), but is not greater than 120°, and the angle (b) defined by each of said bottom walls and said rotor axis is smaller than said angle (c) and greater than 0°.

13. Defibering apparatus as defined in claim 12 wherein said angle (a) is in the range of 20° to 30°, said angle (d) is in the range of 3° to 15°, said angle (c) is at least 30° but not greater than 90°, and said angle (b) is in the range of 3° to 6°.

14. Defibering apparatus as defined in claim 1 wherein *said bottom wall of* each of said pockets [has a bottom wall extending] *extends* in such angular relation with the axis of said rotor as to provide each of said pockets with a substantially greater radial depth adjacent said radially extending wall thereof than at the opposite end thereof.

15. Defibering apparatus as defined in claim 14 wherein one-half the total included angle of each of said working faces is an angle (a) in the range of 15° to 75°, the angle (d) included by said side walls of each of said pockets is in the range of 0° to 60°, the angle (c) defined by each of said back and front walls of said pockets and the axis of said rotor is greater than said angle (a) but is not greater than 120°, and the angle (b) defined by each of said bottom walls and the said rotor axis is smaller than said angle (c) and greater than 0°.

16. Defibering apparatus as defined in claim 1 wherein the edges of each of said land areas on said rotor are symmetrical with respect to the axis of said rotor, and further comprising reversible drive means for said rotor whereby each of said edges can operate selectively as the leading edge of said land area.

17. Defibering apparatus as defined in claim 1 wherein said inlet port is located on the side of said housing, and further comprising a removable closure on said housing forming the wall of said chamber opposite said rotor and stator, means accessible upon removal of said closure for removably mounting said rotor and stator in operative position, and said rotor and stator being proportional for removal and replacement through the opening exposed by removal of said closure.

18. Defibering apparatus as defined in claim 1 wherein one-half the total included angle of each of said working faces is an angle (a) in the range of 15° to 75°, the angle (d) included by said side walls of each of said pockets is in the range of 0° to 60°, and the angle (c) defined by each of said back and front walls of said pockets and the axis of said rotor is greater than said angle (a) but is not greater than 120°.

19. Apparatus for defibering liquid slurry stock, comprising, a. a housing defining an inlet chamber having an inlet port and an outlet chamber having an outlet port,
b. an annular stator mounted within said housing between said chambers and having an internal working face,
c. a rotor mounted in said housing for rotation within said stator on a substantially horizontal axis and having a working face complementary thereto and defining therewith an annular working zone connecting said chambers,
d. one end of said rotor projecting through and beyond the adjacent end of said stator face into said inlet chamber,
e. means on said rotor end forming an annular skirt of greater outer diameter than the inner diameter of the adjacent end of said stator face and cooperating therewith to define a radially outwardly opening circumferential entry slot to said working zone and thereby to minimize the access of high specific gravity materials to said zone, and
f. means including a port below said rotor end for effecting removal of such high specific gravity materials.

20. Defibering apparatus as defined in claim 19 wherein said stator has a frusto-conical internal working face with the smaller end thereof adjacent said inlet chamber, said rotor has a frusto-conical working face complementary to and aligned within said stator face, and the smaller end of said rotor is of smaller diameter than the adjacent end of said stator face and projects axially therethrough into said inlet chamber.

21. Defibering apparatus as defined in claim 19 further comprising baffle means comprising a generally vertical annular partition positioned within said inlet chamber between said inlet port and said rotor with the openings therethrough located generally in line with the axis of said rotor to trap high specific gravity materials entering said inlet port below said opening on the inlet side of said partition and thereby to prevent access thereof to said working zone.

22. Apparatus for defibering liquid slurry stock, comprising:

a. a housing defining an inlet chamber having an inlet port and an outlet chamber having an outlet port,
b. an annular stator mounted within said housing between said chambers and having an internal working face,
c. a rotor mounted in said housing for rotation within said stator on a substantially horizontal axis and having a working face complementary thereto and defining therewith an annular working zone connecting said chambers, and
d. baffle means comprising a generally vertical annular partition positioned within said inlet chamber between said inlet port and said rotor with an opening therethrough located generally in line with the axis of said rotor to trap high specific gravity materials entering said inlet port below said opening on the inlet side of said partition and thereby to prevent access thereof to said working zone.

23. Defibering apparatus as defined in claim 22 wherein said baffle means also comprises means in the space on the inlet port side of said partition for directing stock entering through said inlet port to a level below said opening prior to flow therethrough to said working zone.

*24. Working elements for use in apparatus for defibering liquid slurry stocks which includes a housing defining a chamber having an inlet port and an outlet port adjacent opposite ends thereof, comprising*

*a. an annular stator element having a frusto-conical internal working face and adapted to be mounted within said chamber between said ports with the smaller end thereof adjacent said inlet port,*
*b. a rotor element having a frusto-conical working face complementary to said stator face and adapted to be mounted in said housing for coaxial rotation with said stator element,*
*c. each of said working faces having therein at least one circumferential row of angularly spaced pockets separated by axially extending land areas,*
*d. each of said pockets in said rotor element having generally axially extending side walls and a generally radially extending back wall cooperating with portions of said land areas on said rotor face to form a circumferential land,*
*e. each of said rotor pockets having a bottom wall extending from said back wall thereof to the surface of said rotor whereby said back wall constitutes the only end wall of said pocket,*
*f. each of said pockets in said stator element having generally axially extending side walls and a generally radially extending front wall cooperating with portions of said land areas on said stator face to form a circumferential land,*
*g. each of said stator pockets having a bottom wall extending from said front wall thereof to the surface of said stator whereby said front wall constitutes the only end wall of said pocket, and*

*h. the axial dimensions of said pockets and of said rotor and stator elements being of predetermined relationship locating said circumferential lands thereon in axially staggered relation with each other and in radially opposed relation with said stator and rotor pockets respectively to force the stock to travel back and forth between said pockets in flowing from said inlet port to said outlet port.*

*25. Working elements for use in defibering apparatus as defined in claim 24 wherein said bottom wall of each of said pockets extends in such angular relation with the axis of said rotor element as to provide each of said pockets with a substantially greater radial depth adjacent said radially extending wall thereof than at the opposite end thereof.*

*26. Working elements for use in defibering apparatus as defined in claim 25 wherein one-half the total included angle of each of said working faces is an angle (a) in the range of 15° to 75°, the angle (d) included by said side walls of each of said pockets is in the range of 0° to 60°, the angle (c) defined by each of said back and front walls of said pockets and said rotor axis is greater than said angle (a) but is not greater than 120°, and the angle (b) defined by each of said bottom walls and said rotor axis is smaller than said angle (c) and greater than 0°.*

*27. Working elements for use in defibering apparatus as defined in claim 24 wherein one-half the total included angle of each of said working faces is an angle (a) in the range of 15° to 75°, the angle (d) included by said side walls of each of said pockets is in the range of 0° to 60°, and the angle (c) defined by each of said back and front walls of said pockets and the axis of said rotor element is greater than said angle (a) but is not greater than 120°.*

*28. Working elements for use in defibering apparatus as defined in claim 24 wherein each of said working faces on said rotor and stator elements includes two circumferential rows of said angularly spaced pockets and land areas separated by a second circumferential land, and wherein the axial dimensions of said pockets and of said rotor and stator elements are of predetermined relationship locating all of said circumferential lands thereon in axially staggered relation with each other and in radially opposed relation with said stator and rotor pockets respectively to force the stock to travel back and forth between said rotor and stator pockets in flowing from said inlet port to said outlet port.*

*29. Working elements for use in defibering apparatus as defined in claim 28 wherein said row of pockets adjacent the larger end of each of said rotor and stator elements contains a greater number of said pockets than said row adjacent the smaller end thereof.*

*30. Working elements for use in defibering apparatus as defined in claim 28 wherein at least one of the circumferential and axial dimensions of said pockets in the row adjacent the smaller end of each of said rotor and stator elements is larger than the corresponding dimension of said pockets in the row adjacent the larger end thereof.*

*31. Working elements for use in defibering apparatus as defined in claim 30 wherein said row of pockets adjacent the larger end of each of said rotor and stator elements contains a greater number of said pockets than said row adjacent the smaller end thereof.*

*32. Working elements for use in defibering apparatus as defined in claim 28 wherein one-half the total included angle of each of said working faces is an angle (a) in the range of 15° to 75°, the angle (d) included by said side walls of each of said pockets is in the range of 0° to 60°, and the angle (c) defined by each of said back and front walls of said pockets and the axis of said rotor element is greater than said angle (a) but is not greater than 120°.*

*33. Working elements for use in defibering apparatus as defined in claim 28 wherein one-half the total included angle of each of said working faces is an angle (a) in the range of 20° to 30°, the angle (d) included by said side walls of each of said pockets is in the range of 3° to 15°, and the angle (c) defined by each of said back and front walls of said pockets and the axis of said rotor element is greater than said angle (a) but is not greater than 90°.*

*34. Working elements for use in defibering apparatus as defined in claim 28 wherein each of said pockets has a bottom wall extending generally parallel with the axis of said rotor element to provide each of said pockets with a substantially greater radial depth adjacent said radially extending wall thereof than at the opposite end thereof, and wherein one-half the total included angle of each of said working faces is an angle (a) in the range of 15° to 75°, the angle (d) included by said side walls of each of said pockets is in the range of 0° to 60°, the angle (c) defined by each of said back and front walls of said pockets and the axis of said rotor element is greater than said angle (a), but is not greater than 120°, and the angle (b) defined by each of said bottom walls and said rotor axis is smaller than said angle (c) and greater than 0°.*

*35. Working elements for use in defibering apparatus as defined in claim 34 wherein said angle (a) is in the range of 20° to 30°, said angle (d) is in the range of 3° to 15°, said angle (c) is at least 30° but not greater than 90°, and said angle (b) is in the range of 3° to 6°.*

* * * * *